United States Patent
Bernal et al.

(10) Patent No.: US 9,846,811 B2
(45) Date of Patent: Dec. 19, 2017

(54) SYSTEM AND METHOD FOR VIDEO-BASED DETERMINATION OF QUEUE CONFIGURATION PARAMETERS

(71) Applicant: Conduent Business Services, LLC, Dallas, TX (US)

(72) Inventors: Edgar A. Bernal, Webster, NY (US); Qun Li, Webster, NY (US); Robert P. Loce, Webster, NY (US)

(73) Assignee: CONDUENT BUSINESS SERVICES, LLC, Dallas, TX (US)

(*) Notice: Subject to any disclaimer, the term of this patent is extended or adjusted under 35 U.S.C. 154(b) by 198 days.

(21) Appl. No.: 14/261,013

(22) Filed: Apr. 24, 2014

(65) Prior Publication Data

US 2015/0312529 A1 Oct. 29, 2015

(51) Int. Cl.
*H04N 7/18* (2006.01)
*G06K 9/00* (2006.01)
*G06T 7/246* (2017.01)

(52) U.S. Cl.
CPC ........ *G06K 9/00785* (2013.01); *G06T 7/246* (2017.01); *G06K 9/00771* (2013.01); *G06T 2207/10016* (2013.01); *G06T 2207/30236* (2013.01); *G06T 2207/30241* (2013.01)

(58) Field of Classification Search
CPC .................................................. H04N 7/183
See application file for complete search history.

(56) References Cited

U.S. PATENT DOCUMENTS

| | | | |
|---|---|---|---|
| 6,842,719 B1* | 1/2005 | Fitzpatrick | G06Q 10/06 340/286.09 |
| 2005/0027435 A1* | 2/2005 | Scheppmann | G06K 9/00785 701/117 |
| 2005/0049921 A1* | 3/2005 | Tengler | G06Q 10/087 705/15 |
| 2005/0049940 A1* | 3/2005 | Tengler | G06Q 10/087 705/21 |
| 2006/0064202 A1* | 3/2006 | Gutmann | G05D 1/0221 700/245 |
| 2006/0218057 A1* | 9/2006 | Fitzpatrick | G06Q 10/04 705/28 |
| 2007/0011334 A1* | 1/2007 | Higgins | G06F 11/3604 709/227 |
| 2007/0088620 A1* | 4/2007 | Tengler | G06Q 10/087 705/15 |

(Continued)

OTHER PUBLICATIONS

Gulewicz, V. I. C. T. O. R., and John Danko, "Simulation-based approach to evaluating optimal lane staffing requirements for toll plazas." Transportation research record 1484 (1995): 33.*

(Continued)

*Primary Examiner* — Mohammad J Rahman
(74) *Attorney, Agent, or Firm* — Fay Sharpe LLP

(57) ABSTRACT

A method for automatically determining a dynamic queue configuration includes acquiring a series of frames from an image source surveying a queue area. The method includes detecting at least one subject in a frame. The method includes tracking locations of each detected subject across the series of frames. The method includes generating calibrated tracking data by mapping the tracking locations to a predefined coordinate system. The method includes localizing a queue configuration descriptor based on the tracking data.

20 Claims, 9 Drawing Sheets

(56) References Cited

U.S. PATENT DOCUMENTS

| | | | | |
|---|---|---|---|---|
| 2007/0187183 A1* | 8/2007 | Saigh | ............ | E04H 14/00 186/53 |
| 2008/0107304 A1* | 5/2008 | Coulter | ............ | G06K 9/00369 382/103 |
| 2008/0170751 A1* | 7/2008 | Lei | ............ | G06T 7/2006 382/103 |
| 2009/0151421 A1* | 6/2009 | Susor | ............ | G01G 19/022 73/1.13 |
| 2009/0255195 A1* | 10/2009 | Bridgman | ............ | E04H 14/00 52/174 |
| 2009/0299857 A1* | 12/2009 | Brubaker | ............ | G06Q 30/0269 705/14.66 |
| 2010/0045799 A1* | 2/2010 | Lei | ............ | G06K 9/00369 348/169 |
| 2010/0322476 A1* | 12/2010 | Kanhere | ............ | G06T 7/0065 382/103 |
| 2012/0148094 A1* | 6/2012 | Huang | ............ | G06K 9/00785 382/103 |
| 2012/0246007 A1* | 9/2012 | Williams | ............ | G06Q 30/02 705/14.66 |
| 2013/0027561 A1* | 1/2013 | Lee | ............ | G06Q 30/02 348/150 |
| 2013/0030875 A1* | 1/2013 | Lee | ............ | G06Q 10/06311 705/7.38 |
| 2013/0243260 A1* | 9/2013 | Burry | ............ | G06Q 30/0202 382/105 |
| 2014/0079297 A1* | 3/2014 | Tadayon | ............ | G06K 9/00 382/118 |
| 2014/0201126 A1* | 7/2014 | Zadeh | ............ | G06K 9/627 706/52 |
| 2014/0267793 A1* | 9/2014 | Wang | ............ | G06K 9/00785 348/207.1 |
| 2015/0310370 A1* | 10/2015 | Burry | ............ | G06K 9/00711 705/7.26 |
| 2015/0310459 A1* | 10/2015 | Bernal | ............ | G06Q 30/0201 705/7.29 |
| 2015/0310624 A1* | 10/2015 | Bulan | ............ | G06T 7/2053 382/103 |

OTHER PUBLICATIONS

Kumar, "The competitive impact of service process improvement: Examining customers' waiting experiences in retail markets", Journal of Retailing, pp. 171-180, 2005.*

Mahalanobis Distance, Wikipedia, available from Jan. 25, 2014.*

De Maesschalck, Roy, Delphine Jouan-Rimbaud, and Désiré L. Massart. "The mahalanobis distance." Chemometrics and intelligent laboratory systems 50.1 (2000): 1-18.*

U.S. Appl. No. 13/868,267, entitled "Traffic Camera Calibration Update Utilizing Scene Analysis," filed Apr. 13, 2013 by, Wencheng Wu, et al.

U.S. Appl. No. 14/022,488, entitled "Determining Source Lane of Moving Item Merging Into Destination Lane," filed Sep. 10, 2013 by, Robert Loce, et al.

* cited by examiner

SYSTEM AND METHOD FOR VIDEO-BASED DETERMINATION OF QUEUE CONFIGURATION PARAMETERS

BACKGROUND

The present disclosure relates to a video-based method and system for automatically determining a queue configuration and parameters. The system finds application in analyzing both vehicle and pedestrian queues, but is amenable to other like applications.

While multiple, separate queues aim to shorten customer wait periods for reaching service points, a queue that is moving slower than another can lead to perceived customer inequality. The differences between multiple queues generally depend on customer whim; however, customers tend to enter a queue which is shorter. An example scenario that may lead to this perceived customer inequality is illustrated between FIGS. 1A-B. FIG. 1A is a combined field of view of two cameras monitoring a vehicle queue at a drive-thru. The vehicle queue is defined by a single queue configuration 10 that splits into a side-by-side order point configuration 12, 13 at an intended split point 14. FIG. 1B shows the vehicle queue at the drive-thru during a different time of day when overflow is observed. The vehicles 16 in FIG. 1B are creating two parallel lanes 18, 19 before the intended split point 14. A vehicle waiting in an intended queue can feel cheated when a vehicle arriving later, but entering a faster queue, arrives first at the service point.

In many environments, a single queue is used until the queue area begins to overflow. The overflow may be unexpected, or it can be anticipated during certain peak hours. In the case where the overflow is unexpected, customers can designate a random split point or fan outward in unexpected and disorganized patterns. When this overflow is anticipated and/or observed, the queue may intentionally split to form multiple queues, each organized to hold a certain capacity. Oftentimes, an employee of the business directs the queue to minimize and avoid instances of customers jumping the queue.

This split can also be scheduled in anticipation of the overflow. Alternatively, the capacity of the single queue (or multiple queues) can be expanded by increasing the length, size, or shape of the queue. Similarly, multiple queues can be merged into a single queue when the queue volume is reduced.

Data is desired for making decisions regarding when to modify the queue configuration—i.e., when to split and/or merge queues and how to expand queue capacity. Both the data and the decisions are important to business interested in monitoring customer and store metrics that effect instantaneous and historical store performance, such as queue length and wait time, etc. Although existing methods can automatically determine a length of the queue, an automated method and system is desired to estimate additional parameters associated with the queue configuration, such as a shape or width of the queue, a location of split/merge point(s), wait time, and subject(s) departing from the queue before reaching the service point. Dynamic queue attributes are desired for measuring the capability of a business to deal with customer traffic loads and undesired customer behavior, particularly for aiding the business in making decisions that improve store performance.

INCORPORATION BY REFERENCE

The disclosure of co-pending and commonly assigned U.S. application Ser. No. 13/868,267, entitled "Traffic Camera Calibration Update Utilizing Scene Analysis," filed Apr. 13, 2013 by, Wencheng Wu, et al., the content of which is totally incorporated herein by reference.

The disclosure of co-pending and commonly assigned U.S. application Ser. No. 14/022,488, entitled "Determining Source Lane Of Moving Item Merging Into Destination Lane," filed Sep. 10, 2013 by, Robert Loce, et al., the content of which is totally incorporated herein by reference.

BRIEF DESCRIPTION

One embodiment of the present disclosure relates to a method for automatically determining a dynamic queue configuration. The method includes acquiring a series of frames from an image source surveying a queue area. The method includes detecting at least one subject in a frame. The method includes tracking locations of each detected subject across the series of frames. The method includes estimating a queue configuration descriptor based on the tracking data.

Another embodiment of the present disclosure relates to a system for automatically determining a dynamic queue configuration. The system includes a computer device for monitoring queue dynamics including a memory in communication with a processor. The processor is configured to acquire a series of frames from an image source surveying a queue area. The processor is configured to detect at least one subject in a frame. The processor is configured to track locations of each detected subject across the series of frames. The processor is configured to estimate a queue configuration descriptor based on the tracking data.

DETAILED DESCRIPTION

Figure 2:
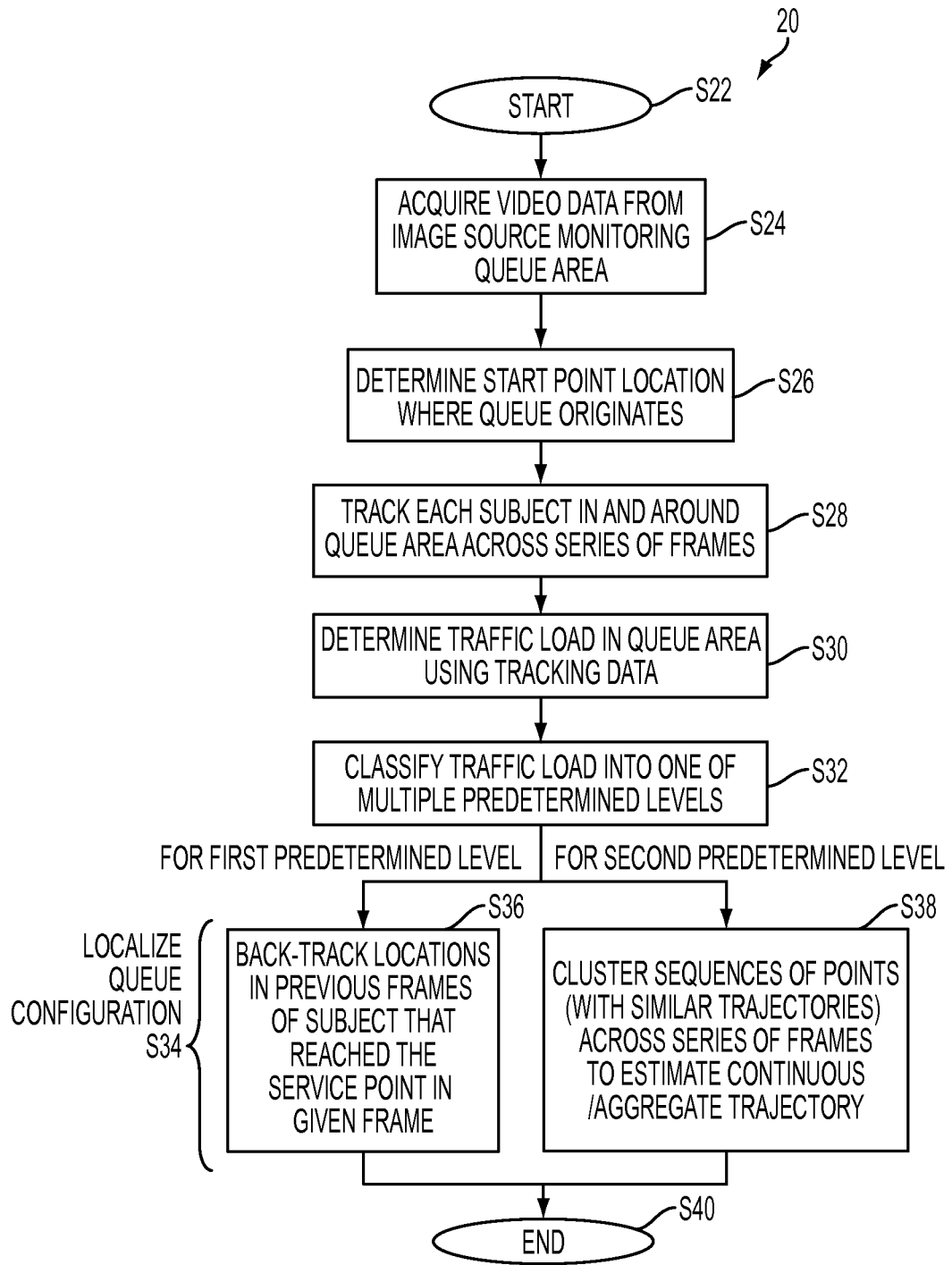
FIG. 2 is a flowchart illustrating an overview of the present method for automatically determining queue configuration parameters.

The present disclosure relates to a video-based method and system for automatically determining a queue configuration and parameters. FIG. 2 is a flowchart illustrating an overview of the present method 20. The method starts at S22. The system acquires video data from an image source monitoring a region of interest ("queue area") at S24. In response to a queue being present in the queue area, a location corresponding to a service point where the queue originates is determined at S26. For the discussed embodiment, the queue originates where a subject—waiting in the queue—reaches a service point and not where the subject enters the queue. Each subject and its location are identified for a given frame of the video data. Using this location information, each subject is tracked in and around the monitored queue area over a series of frames at S28. The tracking data is used to determine the traffic load in the queue area at S30. The metric representing the traffic load is applied to a threshold or classification algorithm, which classifies the traffic load as belonging to one of a number of predetermined levels at S32. In one embodiment, the metric can be associated with volume. In other words, a decision regarding the level of customer traffic is made based on the tracking data. At S34, one or more queues are localized to determine a queue configuration. In response to the traffic load belonging to a first predetermined level, the queue configuration is estimated by back-tracking the track(s) of the subject(s) that reached the service point at S36. Herein, this approach is referred to as the variable pipeline latency approach. In the context of this disclosure, pipeline latency refers to the amount of time that elapses between the moment an algorithm is called and the moment when the algorithm issues an output. In response to the tracking data belonging to a second predetermined level, the queue configuration is estimated by clustering sequences of tracking data points across a series of frames at S38. In other words, similar trajectories are clustered together to estimate a continuous queue configuration. Herein, this approach is referred to as the constant pipeline latency approach. Using the estimated queue configuration, queue parameters/attributes can be identified and/or computed. The method ends at S40.

Figure 3:
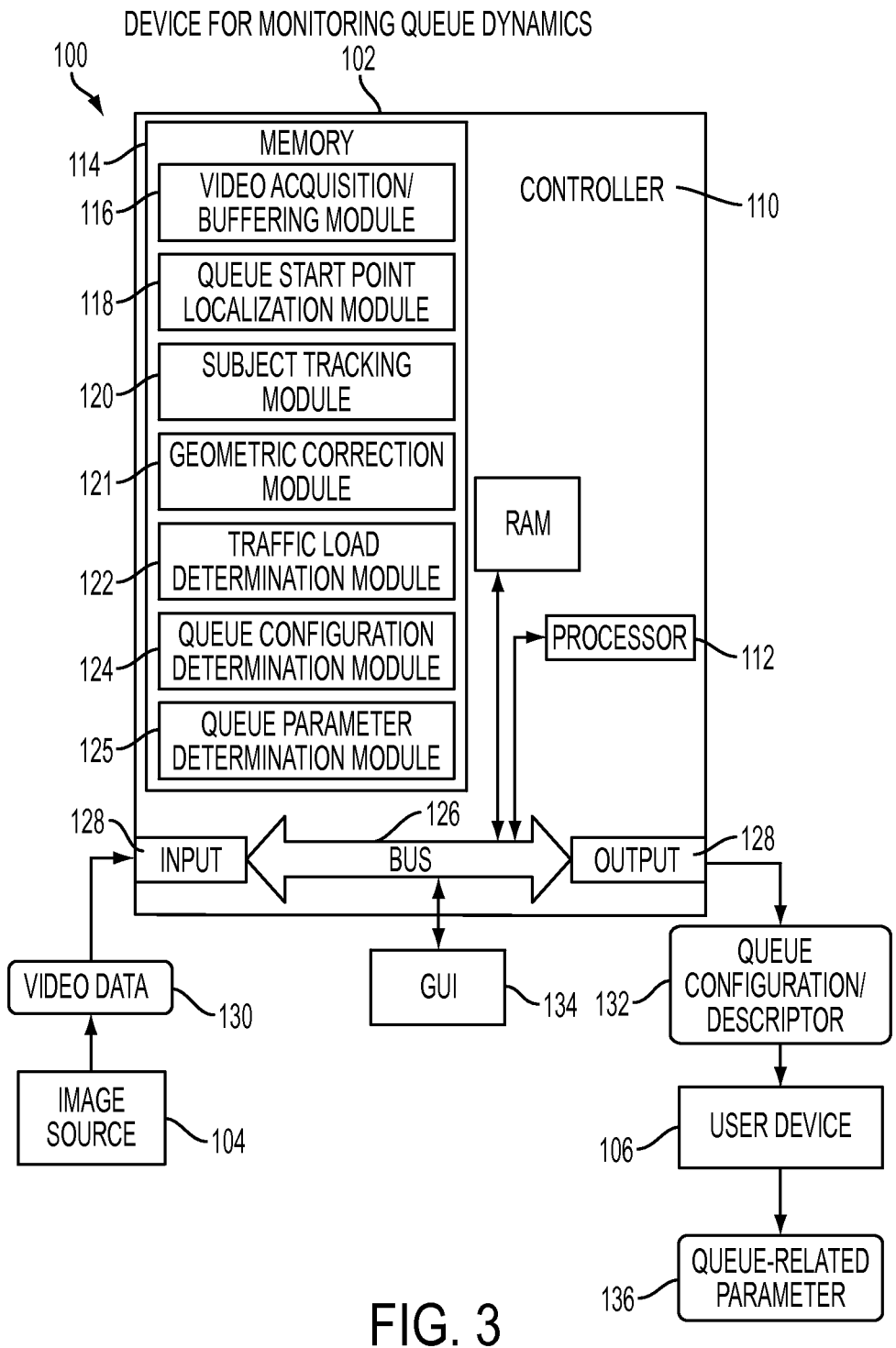
FIG. 3 is a schematic illustration of a video-based method and system for automatically determining a queue configuration and parameters.

FIG. 3 is a schematic illustration of a vision-based system 100 for automatically determining a queue configuration and parameters. The system 100 includes a device for monitoring queue dynamics 102 and an image source 104 linked together by communication links, referred to herein as a network. In one embodiment, the system 100 may be in further communication with a user device 106. These components are described in greater detail below.

The device for monitoring queue dynamics 102 illustrated in FIG. 3 includes a controller 110 that is part of or associated with the device 102. The exemplary controller 110 is adapted for controlling an analysis of image or video data (hereinafter "video data") received by the system 100. The controller 110 includes a processor 112, which controls the overall operation of the device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the device 102, executes instructions stored in memory 114 for performing the parts of the method outlined in FIGS. 2 and 4. In some embodiments, the processor 112 and memory 114 may be combined in a single chip.

The device 102 may be embodied in a networked device, such as the source 104, although it is also contemplated that the device 102 may be located elsewhere on a network to which the system 100 is connected, such as on a central server, a networked computer, or the like, or distributed throughout the network or otherwise accessible thereto. In other words, the processing can be performed within the image source 104 on site or in a central processing offline or server computer after transferring the video data through a network. In one embodiment, the image source 104 can be a device adapted to relay and/or transmit the video data 130 to the device 102. In another embodiment, the video data 130 may be input from any suitable source, such as a workstation, a database, a memory storage device, such as a disk, or the like. The image source 104 is in communication with the controller 110 containing the processor 112 and memories 114.

The stages disclosed herein are performed by the processor 112 according to the instructions contained in the memory 114. In particular, the memory 114 stores a video buffering module 116, which acquires video data from a video of the queue area; a queue start point localization module 118, which determines a location(s) of the queue point(s) of origin; a subject tracking module 120, which tracks the location of subjects (e.g., vehicles or people) in and around the monitored queue area across a series of frames; a traffic load determination module 122, which determines a level of queue traffic based on the tracking data; and, a queue configuration determination module 124, which localizes one or more branches associated with the queue configuration using a process being based on the level of queue traffic. Further contemplated embodiments can also include a traffic data geometric correction module 121, which resolves ambiguities introduced by perspective distortion intrinsic to video the video data. Particularly in a case where multiple cameras are used, the module 121 maps the coordinate systems of each individual camera to a single common coordinate system. Further contemplated embodiments can also include a queue parameter determination module 125, which determines a queue-related parameter(s) relevant to the metric being sought. Embodiments are contemplated wherein these instructions can be stored in a single module or as multiple modules embodied in different devices. The modules 116-125 will be later described with reference to the exemplary method.

The software modules as used herein, are intended to encompass any collection or set of instructions executable by the device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the device 102 may be all connected by a bus 126.

With continued reference to FIG. 3, the device 102 also includes one or more communication interfaces 128, such as network interfaces, for communicating with external devices. The communication interfaces 128 may include, for example, a modem, a router, a cable, and and/or Ethernet port, etc. The communication interfaces 128 are adapted to receive the video data 130 as input.

The device 102 may include one or more special purpose or general purpose computing devices, such as a server computer, controller, or any other computing device capable of executing instructions for performing the exemplary method.

FIG. 3 further illustrates the device 102 connected to the image source 104 for acquiring and/or providing the video data in electronic format. The source 104 (hereinafter "video camera 104") may include one or more surveillance cameras that capture video from the scene (queue area) of interest. The number of cameras may vary depending on a length and location of the queue area being monitored. Multiple cameras may be required where the length of a queue easily extends beyond a single camera field of view. It is contemplated that the combined field of view of multiple cameras typically comprehends the entire area surrounding the queue area. For performing the method at night in areas without external sources of illumination, the video camera 104 can include near infrared (NIR) capabilities.

With continued reference to FIG. 3, the video data 130 undergoes processing by the device for monitoring queue dynamics 102 to output the queue configuration 132 and/or the queue-related parameter 136.

Furthermore, the system 100 can display the output in a suitable form on a graphic user interface (GUI) 134. The GUI 134 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112. Alternatively, the device 102 can provide the output to a user device 106, which can display the output to a user, such as the business monitoring its store performance. Furthermore, in one contemplated embodiment, queue configuration 132 and/or the queue-related parameter 136 can be transmitted to another computer application, which can perform additional processing on the data for making decisions regarding when and how to modify the queue configuration.

Figure 4A:
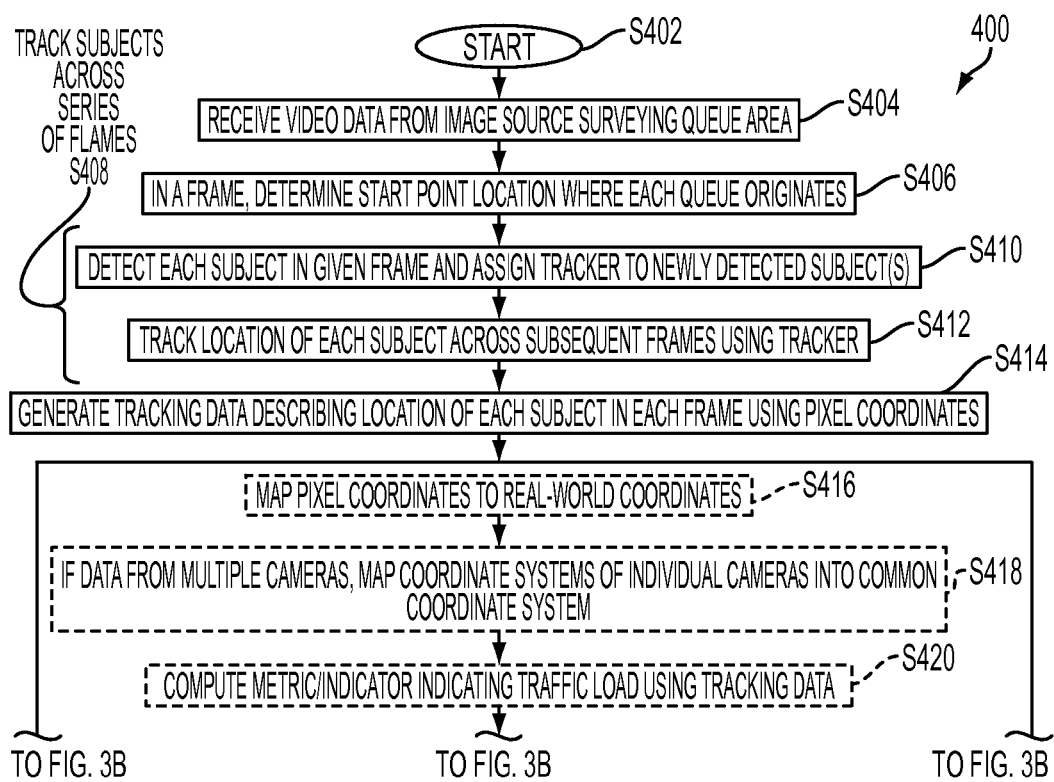
FIGS. 4A-4B is a detailed flowchart describing a method for automatically determining a queue configuration and parameters.
Figure 4B:
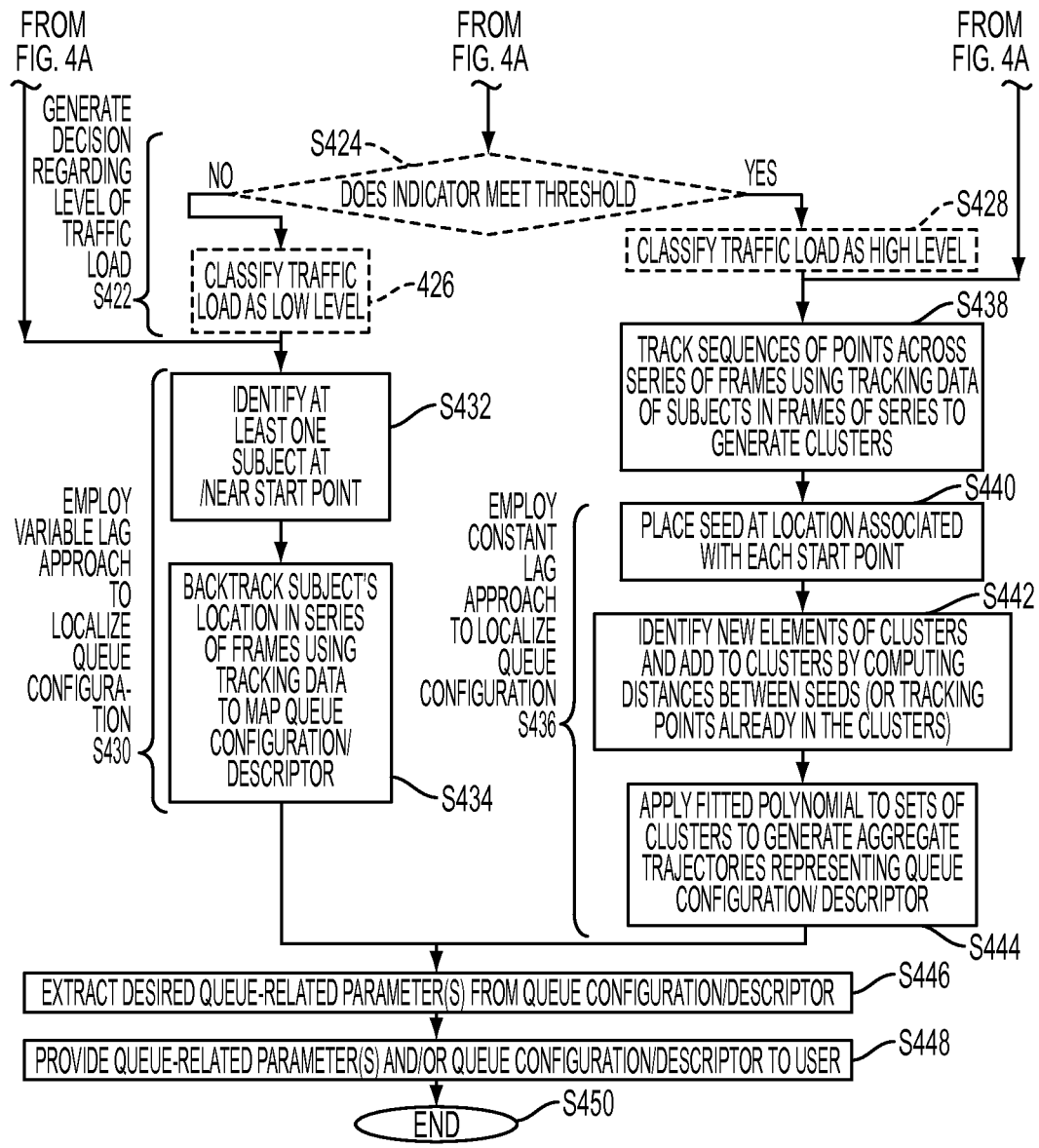

FIG. 4A-B is a detailed flowchart describing a method 400 for automatically determining a queue configuration and parameters. The method starts at S402. At S404, the video buffering module 116 receives video data—such as a sequence of frames—from the image source 104 surveying the queue area. In contemplated embodiments, the module 116 can receive the video data from multiple video cameras each capturing a portion of the queue located in its respective field of view. The video buffering module 116 transmits the acquired video data to the queue start point localization module 118.

For a given frame, the queue start point localization module 118 determines the location of the point(s) of origin ("start point") where the queue forms at S406. In the discussed embodiment, the queue originates where a subject—waiting in the queue—reaches a service point and not where the subject enters the queue. For example, where the present method is implemented in a fast-food drive-thru, the start point can correspond to the location of the menu—where orders are placed using microphones—or the payment and/or the pick-up windows. In other words, the location can change depending on the desired performance measure being analyzed by the business. Furthermore, multiple start points can be simultaneously analyzed. These start points can correspond to separate queues or can fall in line with one another, such as the foregoing example where the queue moves from the menu, then to the payment window, and then to the pick-up window.

In certain environments, the start points are fixed. Accordingly, the localization can be performed manually, where the module 118 determines the location of a start point identified by the user via corresponding input for one frame. For example, the user can point to the start point in the given frame using an input device of the GUI 134.

The module 118 then identifies the start point in each remaining frame being processed using the computed location. Alternatively, the module 118 can automatically learn the location of the start point over time since the location does not change across the series of frames. This learning approach can be performed, for example, by identifying locations where multiple subjects stop repeatedly, and for predetermined periods of time, based on a historical analysis of subject tracking data.

Continuing with FIG. 4A, the subject tracking module 120 tracks each subject across the series of frames at S408. The module detects subjects in a first frame or across a set of initial frames being processed in the series of frames and assigns a tracker to each subject. As the module 120 processes the series of frames, it detects and assigns a tracker to each new subject (not previously assigned a tracker) in a given frame at S410. Generally, the module 120 determines the location of each tracked subject across subsequent frames at S412 using the tracker. The module 120 anticipates that the subjects move with the queue in the scene, and the locations therefore change over time.

In an embodiment where video data is acquired from multiple video cameras, the module 120 can identify the entry and exit points for the fields of view of multiple cameras monitoring the scene. Using these known points, the module 120 can identify a tracked subject as it exits a first camera field of view and enters a second camera field of view. Alternatively, the module 120 can use features that are robust to different camera views, such as a color-based tracker that tracks each vehicle based on features related to its color appearance such as color histograms. Other features that remain unchanged across different camera views can be used to track subjects across different camera views. These features can include biometric features, clothing patterns or colors, license plates, vehicle make and model, etc. Cloud-point based trackers can also be used as long as the vehicle pose does not change drastically across cameras.

There is no limitation to the type of tracker used to track subjects; any existing tracking technology can be used to process the video data including, for example, point- and global feature-based algorithms, silhouette/contour, and particle filter trackers.

Figure 5:
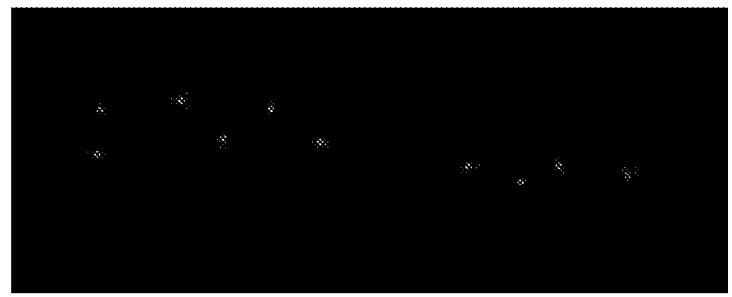
FIG. 5 shows an example mapping of spatio-temporal information corresponding to the frame illustrated in FIG. 1B.

For each frame that a subject remains within the camera (or combined cameras) field of view, the module 120 generates spatio-temporal information ("tracking data") describing the location of the subject in pixel coordinates as a function of time at S414, and can include a corresponding frame number. FIG. 5 shows an example output of tracking data corresponding to the frame illustrated in FIG. 1B.

Figure 1A:
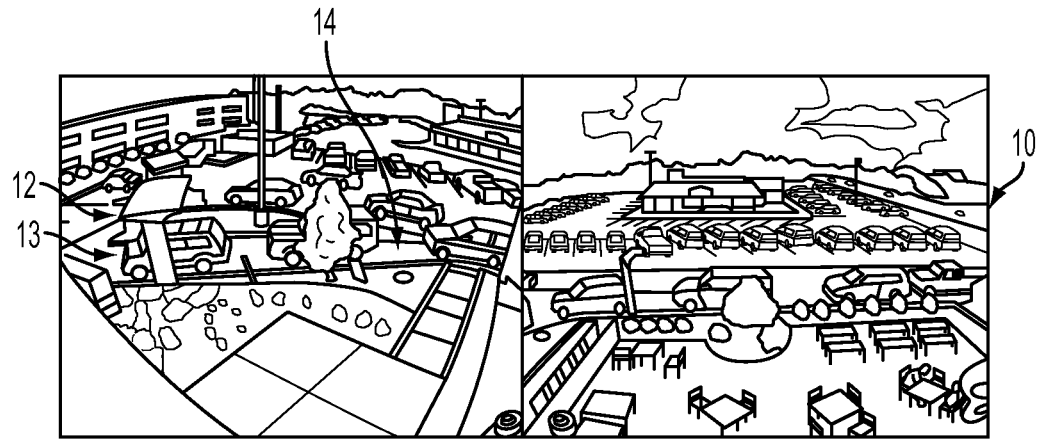
FIG. 1A shows an example vehicle queue at a drive-thru defined by a single queue configuration that splits into a side-by-side order point configuration at an intended split point.
Figure 1B:
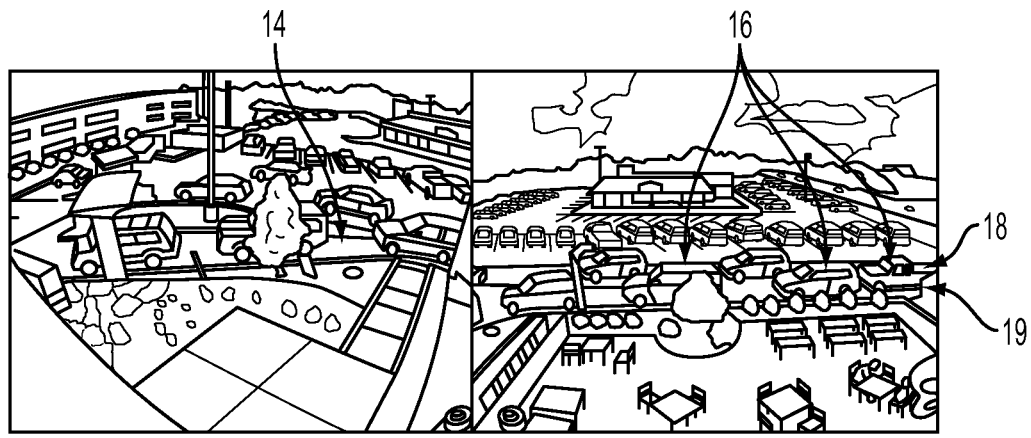
FIG. 1B shows the vehicle queue at the drive-thru of FIG. 1A during a different time of day when overflow results in parallel lanes being created before the intended split point.

Because the acquired video frame(s) is a projection of a three-dimensional space onto a two-dimensional plane, ambiguities can arise when the subjects are represented in the pixel domain (i.e., pixel coordinates). These ambiguities are introduced by perspective distortion, which is intrinsic to the video data. In the embodiments where video data is acquired from more than one camera (each associated with its own coordinate system), apparent discontinuities in motion patterns can exist when a subject moves between the different coordinate systems (i.e., between different camera views). These discontinuities make it more difficult to interpret the data. An example of this scenario can be observed in FIG. 5, which is a mapping of the vehicles in the one frame illustrated in FIG. 1B. For example, although FIG. 1B shows that two parallel lanes 18, 19 exist before the intended split point 16, the queue appears as a single lane before the split point in FIG. 5. Characteristics of the queue configuration (such as a width of the queue portion before the split point in FIG. 1B) may not be easily determined from the mapping (shown in FIG. 5).

Figure 6:
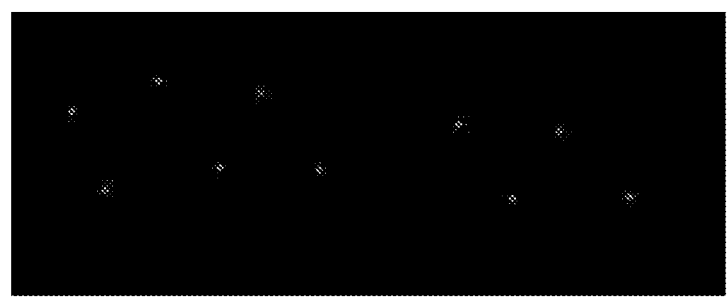
FIG. 6 shows an example mapping of the tracking data in FIG. 5 to a common coordinate system.

In one embodiment, the traffic data geometric correction module 121 can resolve these ambiguities by performing a geometric transformation by converting the pixel coordinates to real-world coordinates at S416. Particularly in a case where multiple cameras cover the entire queue area, the module 121 maps the coordinate systems of each individual camera to a single, common coordinate system at S418. For example, the spatial coordinates corresponding to the tracking data from a first camera can be mapped to the coordinate system of a second camera. In another embodiment, the spatial coordinates corresponding to the tracking data from multiple cameras can be mapped to an arbitrary common coordinate system which may facilitate subsequent analysis. As mentioned supra, FIG. 1B is a combined field of view of two cameras monitoring a vehicle queue at a drive-thru. FIG. 6 shows a mapping of the vehicles in FIG. 1B, where the module 121 mapped the tracking data from the first camera to the coordinate system of the second camera.

Any existing camera calibration process can be used to perform the estimated geometric transformation. One approach is described in the disclosure of co-pending and commonly assigned U.S. application Ser. No. 13/868,267, entitled "Traffic Camera Calibration Update Utilizing Scene Analysis," filed Apr. 13, 2013 by, Wencheng Wu, et al., the content of which is totally incorporated herein by reference.

While calibrating a camera can require knowledge of the intrinsic parameters of the camera, the calibration required herein need not be exhaustive to eliminate ambiguities in the tracking information. For example, a magnification parameter may not need to be estimated.

Figure 7:
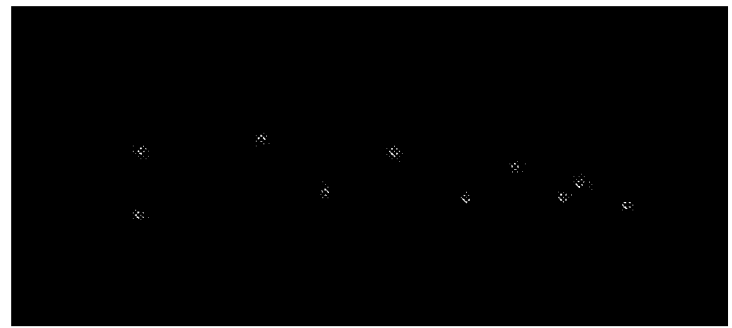
FIG. 7 shows a simulated top-view of the tracking data from FIG. 5, which can be generated by calibrating the tracking data to ground level.

Another embodiment alternatively contemplates performing a calibration that determines locations of the tracking data on a fixed plane. FIG. 7 shows a simulated top-view of the tracking data from FIG. 5, which can be generated by calibrating the tracking data to ground level.

Returning to FIG. 4, the traffic load determination module 122 computes a metric ("indicator") indicating traffic load using the tracking data at S420. In one embodiment, the "traffic load" can refer to occupancy or volume (e.g., heavy/light) in the queue area and speed of traffic at any point in time or over time. In more specific detail, the metric used to indicate traffic load can be selected based on a queue-related parameter-of-interest. For illustrative purposes, in an example where a drive-thru scenario is being monitored, this parameter-of-interest is related to drive-thru occupancy. The (fast food, bank, etc.) business expects the rate at which a vehicle moves through the queue to be affected by the number of vehicles occupying the queue area. In other words, the greater the number of vehicles occupying the queue area, the slower a vehicle is expected to move through the queue.

In one embodiment, the metric can include the number of tracked subjects in the queue area, although other metrics or a combination thereof can be computed as the indicators of traffic load. For example, historical statistics of traffic load as a function of time of day, time of year, weather conditions, day of the week, date, and a combination thereof, can be used as indirect indicators or estimates of traffic load. In the discussed embodiment, the module 122 can calculate a number of points represented in the mapping that was generated by one of modules 118 and 120. In other words, for illustrative purposes, the direct indicator(s) of occupancy in the drive-thru example can be extracted from an actual count of the number of vehicles in the queue area, which is in turn determined by the number of active trackers. Given the spatial configuration of a typical drive-thru, full vehicle counts across a full length of the drive-thru trajectory typically requires employing a network of cameras, while partial counts—while less informative of the traffic conditions in the queue area—can be achieved with fewer computational and hardware resources. Accordingly, this count computation can be performed across the full length of the queue area or across select portions of the queue (such as, for example, the section of queue located before the order point in the drive-thru example).

A decision regarding the level of the traffic load is made based on the indicator at S422. The decision is made based on indicators that influence motion patterns in the scene being monitored. Therefore, the indicator that is selected for determining the level typically depends on the application. Therefore, select indicator/metric value representing the traffic load is applied to a threshold or a coarse classification algorithm, which classifies the traffic load as belonging to one of a number of predetermined levels at S424.

As mentioned, the traffic load can also be influenced and/or affected by other indicators. Examples of indirect indicators can include a time of day and/or year, a day of the week, a specific date, weather and incident reports, and a number of point-of-sale transactions within a given time interval, etc. Indirect indicators are useful in applications where a volume of subjects occupying a specific queue area is highly regulated and predictable. In other embodiments, as well, the module 122 can implement a rule that overrides and/or changes the computed decision based on the indirect indicator. For example, where it is known that traffic load is high during a certain time of day, the system can automatically classify the traffic load as belonging to a predetermined level during that certain time of day, regardless of whether the level would be classified as belonging to a different level based on an unanticipated metric value during that time of day.

For illustrative purposes, in an example embodiment, the predetermined levels representing traffic load fall into one of low and high traffic loads. Finer grain classification schemes can be used. In response to the input indicator value falling below a threshold (NO at S424), the traffic load is classified as belonging to a low traffic or occupancy level at S426. "Low" traffic and/or occupancy generally refers to situations where few subjects are occupying a queue area. In response to the input indicator value meeting and exceeding the threshold (YES at S422), the traffic load is classified as belonging to a high traffic or occupancy level at S428. "High" traffic and/or occupancy generally refers to situations where many subjects are occupying a queue area.

The module 122 transmits the decision regarding the level to the queue configuration determination module 124, which localizes one or more queue configurations or branches associated with a single queue configuration using a process being based on the level of queue traffic. In response to the traffic load belonging to the first predetermined (low) level, the module 124 employs a variable pipeline latency approach—that is proportional to the time a subject takes to traverse the queue—to localize the queue configuration at S430. Mainly, the queue configuration determination is achieved by 'backtracking' (in time) a trajectory of at least one subject that is known to reach/arrive at the start point. Arrival of a subject at the start point is detected by computing a distance between the known location of the start point and the location of the subject as described by the tracking data: if this computed distance is smaller than a predetermined threshold, an arrival event is triggered. In other words, the module 124 identifies at least one subject (previously assigned a tracker) located at or near the start point in a processed frame at S432. The module 124 backtracks the subject's movement through previous frames until the frame corresponding to when the subject entered the queue area.

Figure 8:
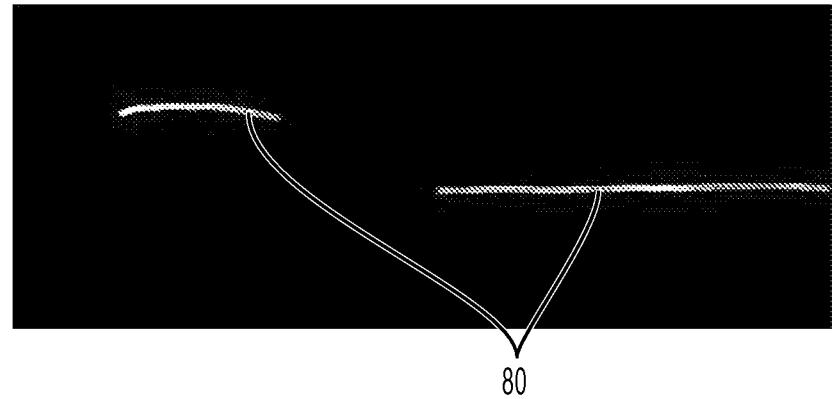
FIG. 8 shows an example trajectory of a single subject used in a variable pipeline latency approach to localize the queue.

The subject's location (previously determined at S412) in each of the series of frames is backtracked to map the queue configuration at S434. FIG. 8 shows an example trajectory of a single subject used in a pipeline latency approach to localize the queue. This queue configuration reflects the movement of one subject in the queue area illustrated in FIG. 1A. In one embodiment, the backtracking data of multiple subjects may be aggregated for added robustness and reduced pipeline latency. Specifically, the trajectory of a subject that reached the start point can be backtracked until it overlaps a trajectory of another subject, at which point the trajectory of the new subject is backtracked. This procedure is repeated until the trajectory of the last subject in line is backtracked. As mentioned, FIG. 1B is a combined field of view of two cameras monitoring a queue area. Accordingly, the queue configuration 80 shown in FIG. 8 is discontinuous between the different cameras fields of views. The configuration 80 in FIG. 8 is not mapped to a common coordinate system, but rather reflects where the subject entered and exited the queue area in each of the two cameras respective field of views. Furthermore, while the example shown in FIG. 8 is a single queue configuration, multiple queues and/or arms branching out from a single queue can be identified using this variable pipeline latency approach.

Because the line localization data is not available until the subject reaches the start point, this output is produced with a time latency. This time latency generally corresponds to at least the duration it took for the subject to traverse the queue. In some instances, the variable pipeline latency approach described in the present disclosure aims to produce queue configuration output information in real-time; this occurs, for example, in cases where the duration is minimal and the required time latency is short. In other instances when no real-time notification is required, larger durations and time latencies can be acceptable, such as when the data collection is performed for a future historical analysis. Accordingly, embodiments are contemplated that also use this variable pipeline latency approach to map the queue configuration where the traffic load is classified as belonging to a high traffic or occupancy level (at S426). In order to decrease the time latency, particularly where the traffic load is high, the module 124 can track a chain of subjects during a short time interval(s) as described supra so that at the end of the interval, each subject occupies a space that was previously occupied by a different subject at the beginning of the interval.

Figure 9A:
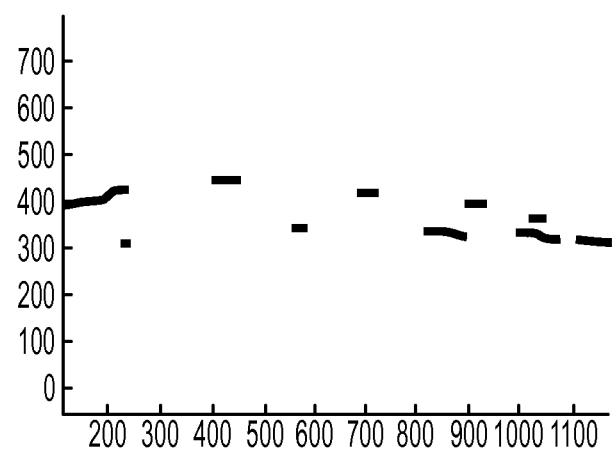
FIG. 9A shows the example sequences of tracking data (coordinates) for all points (of multiple subjects) across a fixed number of frames.
Figure 9B:
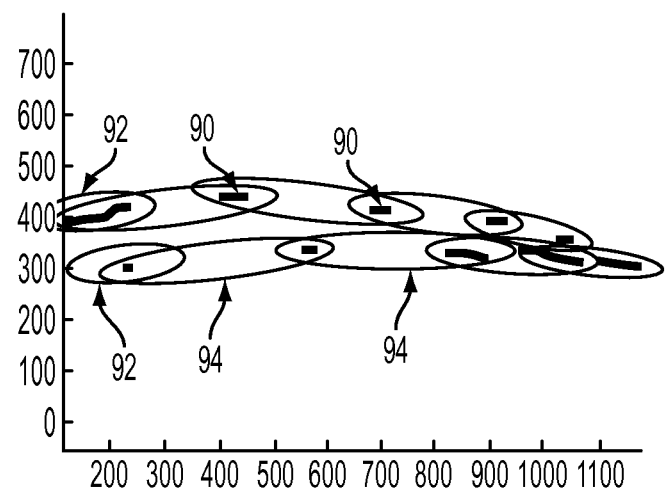
FIG. 9B shows the trajectories for clusters of points computed using the tracking data of FIG. 9A.

Returning to FIG. 4B, in response to the traffic load belonging to the second predetermined (high) level, the module 124 employs a constant pipeline latency approach to localize the queue configuration in real-time at S436. In this approach, the module 124 processes a fixed number of the series of frames as a batch. In other words, the module 124 can concatenate the data corresponding to a select portion of the total number of frames, if desired, particularly for longer videos. As part of this processing, the module 124 clusters sequences of tracking data points across the frames according to the spatial-coordinate histories of the subjects that were tracked in the fixed number of frames at S438. FIG. 9A shows tracking data (coordinates) for all points (of multiple subjects) across a fixed number of frames. As mentioned supra, this tracking data can be mapped to a common coordinate system if it is based on video data from two or more cameras. FIG. 9B shows clusters that were computed using the tracking data of FIG. 9A. At this stage, each identified cluster of trajectories 90 is treated as an individual queue. At S440, in order to identify the overall queue configuration(s), the module 124 places a cluster seed 92 at the location corresponding to each start point (previously identified at S406). At the end of the clustering process, each seed will belong to a separate cluster and thus, define a separate cluster.

Once seeds are defined, new elements of the clusters are identified and added to the clusters. This is achieved by computing distances (according to a predetermined distance metric) between the seeds or tracking points already in the clusters, and tracking points currently unassigned to clusters at S442 in an iterative manner. Specifically, after each iteration, at most one subject trajectory $x_i$ for subject i is added to each cluster, namely, the trajectory that is closest to the existing cluster relative to the distance metric used. Note that a subject trajectory is the set of tracking locations corresponding to one subject across the fixed number of series of frames that define a batch. In other words, $x_i = \{x_{i1}, \ldots, x_{in}\} = \{(r_{i1}, c_{i1}), \ldots, (r_{in}, c_{in})\}$, where n is the number of frames in the batch and $(r_{ij}, c_{ij})$ are subject i's row and column coordinates for frame j. In some embodiments, the subject coordinates are given in real-world coordinates which can be three-dimensional. In one embodiment, only trajectories are added to a cluster if their distance to the cluster is smaller than a predetermined threshold D. In other words, it may not be sufficient for a trajectory to be nearest a given cluster for it to be added to the cluster; in those cases, the trajectory also needs to be closer to the cluster than a predetermined distance threshold. This process where individual subject trajectories are added to clusters is repeated until all trajectories are processed. In one embodiment, the distance metric includes a variation of the Mahalanobis distance $(\bar{x}_i - \bar{x}_j)^T Q^{-1} (\bar{x}_i - \bar{x}_j)$ computed between the centroid of the most recent subject trajectory added to the cluster, $x_i$ and the centroid of the candidate trajectory $x_j$, wherein the covariance estimate Q is given by the sample covariance of the last trajectory added to the cluster. Specifically, $$\overline{x_l} = (\overline{r_l}, \overline{c_l}) = \frac{x_{i1} + \ldots + x_{in}}{n} = \frac{(r_{i1},) + \ldots + x_{in}}{n}$$

and the entries of Q are given by $$q_{kl} = \frac{\sum_{i=1}^{n}(r_{ki} - \overline{r_k})(c_{li} - \overline{c_l})}{n-1}.$$

If the obtained sample covariance is close to singular, then the sample covariance of the candidate trajectory can be used instead. Alternatively, more temporal samples can be accumulated in order to avoid singularities, for example, by making the batch of frames larger, that is, comprise a larger number of frames. The effect of using this distance metric is that distances along the direction of motion of each trajectory are compressed, while distances perpendicular to that direction are expanded, thus giving preference to grouping sets of tracking points having co-linear or close to co-linear trajectories, such as when subjects in separate queues move along linear trajectories that are aligned close together. Consequently, the cluster to which each candidate trajectory is added is based on the candidate trajectory's distance to said cluster. In this manner, the distance between clusters and trajectories, and the alignment of the trajectories belonging to a cluster along the direction of subjects' motion, can be identified.

Figure 9C:
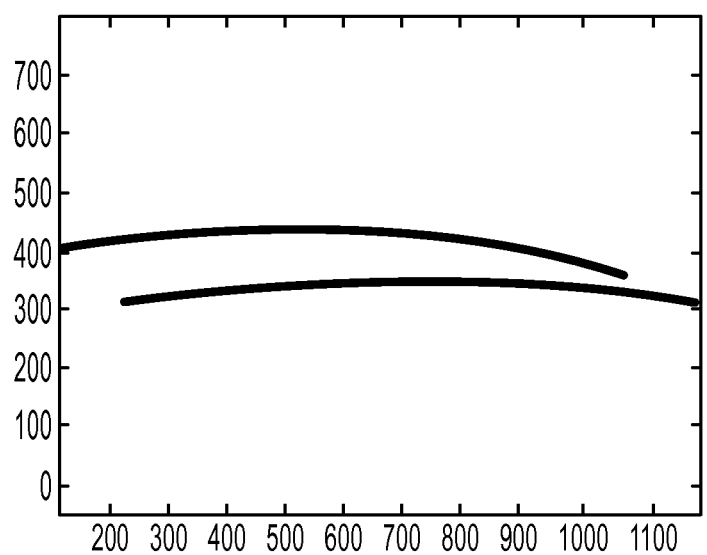
FIG. 9C shows the trajectories obtained by fitting a polynomial to each of the sets of clusters identified in FIG. 9B.

When there are no more candidate trajectories to be added, regression techniques can be performed on the sets of clusters to identify the underlying primitive descriptors of each lane. Said primitive descriptors can include a manifold, a polynomial, a set of splies, etc., and describe the trajectories defined by the clusters at S444. A spline or manifold is fitted to each of the resulting sets of clusters to identify the different queues or branches associated with the queue configuration, although any other primitive can be used, such as piece-wise polynomials/splines. In one embodiment, manifolds can be fit to the sets of clusters belonging to each queue configuration because the set of trajectories in a cluster defines a one-dimensional manifold(s) (i.e., line or curve) in a two-dimensional (pixel coordinates or real-world coordinates) space or a three-dimensional (real-world coordinates). FIG. 9C shows the aggregate trajectories obtained by fitting a polynomial to each of the cluster of trajectories identified in FIG. 98.

In both the variable and constant pipeline latency approaches, the module 124 generates output (for example, in the form of a curve, set of curves, and a set of points, etc., in the image domain) that is treated as a primitive descriptor of the queue configuration at S434 and S444.

The queue parameter determination module 125 extracts queue-related parameters from the primitive descriptor at S446. Generally, the queue-related parameters can vary between applications. The parameters which the module 125 extracts can be based on their relevance to the task at hand. Examples of queue-related parameters include, but are not limited to, a split point location, queue length, queue width, any imbalance in side-by-side order point queues, queue outline/boundaries, and statistics of queue times/wait periods, etc.

Figure 9D:
FIG. 9D shows an estimated queue boundary/outline computed as a binary image of FIG. 9C.

In one contemplated embodiment, for example, the module 125 can extract the boundary/outline of the queue configuration by performing a morphological dilation on a binary image, which is generated from the primitive descriptor of the queue configuration. In other words, the module 125 can generate a binary image of the queue configuration, and then perform a dilation operation on the binary image, to estimate the queue boundary. FIG. 9D shows an estimated queue boundary, which was computed as a binary image of FIG. 9C. Based on the estimated queue boundary, determinations as to whether a given subject forms part of a queue or leaves a queue can be made.

In yet another embodiment, further processing can be performed on the extracted parameter to identify certain events. For example, the binary image can be analyzed to identify subjects that depart from the queue, thus indicating subjects that are unwilling to wait in the queue given the pace the queue is moving, etc. The system can provide a user with a real-time notification of the queue-related parameters at S448. The method ends at S450.

One aspect of automatically detecting queue dynamics is that the data can aid businesses in making informed decisions aimed at improving customer throughput rates, whether in real-time or for the future. Similarly, histories of queue-related parameters, and their correlation with abnormal events, (such as vehicle drive-offs, drive-bys, drive-arounds at a drive-thru queue area, or walk-offs in a pedestrian queue) and other anomalous incidents can shed light into measures the business can take to avoid a reoccurrence of these undesired events.

There is no limitation made herein to the type of business or the subject (such as customers and/or vehicles) being monitored in the queue area. The embodiments contemplated herein are amenable to any application where subjects can wait in queues to reach a goods/service point. Non-limiting examples, for illustrative purposes only, include banks (indoor and drive-thru teller lanes), grocery and retail stores (check-out lanes), airports (security check points, ticketing kiosks, boarding areas and platforms), road routes (i.e., construction, detours, etc.), restaurants (such as fast food counters and drive-thrus), theaters, and the like, etc. The queue configuration and queue-related parameter information computed by the present disclosure can aid these applications.

Although the method 200, 400 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for automatically determining a dynamic queue configuration, the method comprising:
   a queue dynamics monitoring device acquiring a series of frames from an image source surveying a queue area;
   the queue dynamics monitoring device detecting at least one subject in a frame;
   the queue dynamics monitoring device tracking locations of each detected subject across the series of frames;
   in response to an occupancy in the queue area meeting a predetermined level, the queue dynamics monitoring device clustering sequences of points across the series of frames using the tracking locations of the subjects;
   the queue dynamics monitoring device computing a Mahalanobis distance between a centroid of a last trajectory added to each cluster and a select trajectory, wherein the select trajectory is a set of the tracking locations corresponding to one subject, and wherein a covariance estimate is given by a sample covariance of the last trajectory added to the each cluster;
   the queue dynamics monitoring device adding the select trajectory to a nearest cluster according to the computed distances;
   and
   the queue dynamics monitoring device estimating a queue configuration by fitting one of a spline or manifold to the each cluster to identify the queue configuration.

2. The method of claim 1, wherein the tracking locations of each detected subject includes:
   generating spatio-temporal information describing the locations of the each subject in pixel coordinates as a function of time.

3. The method of claim 1 further comprising:
   performing a geometric transformation on the tracking data by converting the pixel coordinates to one of real-world coordinates, a coordinate system of a camera in the image source, and a reference coordinate system.

4. The method of claim 3 further comprising:
   in response to the tracking data being acquired from at least two image sources, mapping coordinate systems of each individual image source into a common coordinate system.

5. The method of claim 1 further comprising:
   classifying an occupancy in the queue area into one of at least two predetermined levels.

6. The method of claim 5, wherein the classifying includes:
   computing a metric corresponding to the queue occupancy;
   comparing the metric to a predetermined threshold;
   in response to the metric not meeting the threshold, classifying the occupancy in the queue area as belonging to a first predetermined level; and,
   in response to the metric meeting and exceeding the threshold, classifying the occupancy in the queue area as belonging to a second predetermined level.

7. The method of claim 6 further comprising:
   in response to the occupancy being classified as belonging to the first predetermined level, employing a variable pipeline latency approach to localize the queue configuration descriptor; and,
   in response to the occupancy being classified as belonging to the second predetermined level, employing a constant pipeline latency approach to localize the queue configuration descriptor.

8. The method of claim 1, wherein the estimating the queue configuration descriptor includes:
   determining a start point where a queue forms in at least one of the series of frames;
   identifying at least one subject located near the start point in a select frame;
   backtracking the locations of the at least one subject in the series of frames from the start point; and,
   generating a mapping of the locations of the at least one subject across the series of frames; and,
   fitting a primitive descriptor to the set of locations generated by the mapping; and
   associating the fitted primitive descriptors as the queue configuration descriptor.

9. The method of claim 1, wherein the estimating the queue configuration descriptor includes:
   fitting a primitive descriptor to sets of trajectories belonging to each resulting cluster; and,
   associating the fitted primitive descriptors as the queue configuration descriptor.

10. The method of claim 9, further comprising:
    extracting at least one queue-related parameter from the queue configuration descriptor; and,
    providing the queue-related parameter as output.

11. A system for automatically determining a dynamic queue configuration, the system comprising a server computer device for monitoring queue dynamics including a memory in communication with a processor operative to:
    acquire a series of frames over a network from an image source in communication with the server computer and surveying a queue area;
    detect at least one subject in a frame;
    track locations of each detected subject across the series of frames; and,
    in response to an occupancy in the queue area meeting a predetermined level, clustering sequences of points across the series of frames using the tracking locations of the subjects;
    computing a Mahalanobis distance between a centroid of a last trajectory added to each cluster and a select trajectory, wherein the select trajectory is a set of the tracking locations corresponding to one subject, and wherein a covariance estimate is given by a sample covariance of the last trajectory added to the each cluster;
    adding the select trajectory to a nearest cluster according to the computed distances; and
    estimating a queue configuration by fitting one of a spline or manifold to the each cluster to identify the queue configuration.

12. The system of claim 11, wherein the processor is further configured to:
    generate spatio-temporal information describing the locations of the each subject in pixel coordinates as a function of time.

13. The system of claim 11, wherein the processor is further configured to:
    perform a geometric transformation on the tracking data by converting the pixel coordinates to one of real-world coordinates, a coordinate system of a camera in the image source, and a reference coordinate system.

14. The system of claim 13, wherein the processor is further configured to:

in response to the tracking data being acquired from at least two image sources, map coordinate systems of each individual image source into a common coordinate system.

15. The system of claim 11, wherein the processor is further configured to:
classify an occupancy in the queue area into one of at least two predetermined levels.

16. The system of claim 15, wherein the processor is further configured to:
compute a metric corresponding to the occupancy;
compare the metric to a predetermined threshold;
in response to the metric not meeting the threshold, classify the occupancy in the queue area as belonging to a first predetermined level; and,
in response to the metric meeting and exceeding the threshold, classify the occupancy in the queue area as belonging to a second predetermined level.

17. The system of claim 16, wherein the processor is further configured to:
in response to the occupancy being classified as belonging to the first predetermined level, employ a pipeline latency approach to localize the queue configuration descriptor; and,
in response to the occupancy being classified as belonging to the second predetermined level, employ a constant pipeline latency approach to localize the queue configuration descriptor.

18. The system of claim 11, wherein the processor is further configured to:
fit a primitive descriptor to the set of locations generated by the mapping; and
associate the fitted primitive descriptors as the queue configuration descriptor.

19. The system of claim 11, wherein the processor is further configured to:
track sequences of points across a predetermined number of frames using the tracking data of the each subject to generate a set of trajectories, each trajectory corresponding to a subject;
initialize clusters of trajectories by placing a cluster seed at a location corresponding to each start point where a queue forms;
process at least one trajectory relative to the clusters of trajectories, the trajectory currently unassigned to a cluster, the processing including:
compute a Mahalanobis distance $(x_i-x_j)^T \Sigma^{-1}(x_i-x_j)$ between a centroid of a last trajectory added to a cluster, $x_i$ and an unassigned candidate trajectory $x_j$, wherein a covariance estimate $\Sigma$ is given by a sample covariance of the last trajectory added to the candidate cluster,
in response to the computed distance not meeting and exceeding a predetermined threshold, add the trajectory to the cluster to which the trajectory is closest according to the computed distance,
in response to the computed distance meeting and exceeding a predetermined threshold, discard the trajectory, and
repeat the computing until no trajectories remain to be processed;
fit a primitive descriptor to sets of trajectories belonging to each resulting cluster; and,
associate the fitted primitive descriptors as the queue configuration descriptor.

20. The system of claim 11, wherein the processor is further adapted to:
extract at least one queue-related parameter from the queue configuration descriptor; and,
provide the queue-related parameter as output.

* * * * *